2,763,669

Δ⁴-17-THIO-ANDROSTEN-3-ONES

Raymond M. Dodson, Park Ridge, and Paul B. Sollman, Skokie, Ill., assignors, by mesne assignments, to G. D. Searle & Co., Skokie, Ill., a corporation of Delaware No Drawing. Application March 1, 1955, Serial No. 491,507

8 Claims. (Cl. 260—397.3)

The present invention relates to a new class of thiosteroids and is specifically concerned with those derivatives of 4-androsten-3-one which are substituted at the 17-position by a substituent containing sulfur in a bivalent state, said substituent being attached to the carbon atom at position 17 by a carbon-sulfur valence bond. Accordingly, the thio-substituted androstene derivatives which comprise this invention can be represented by the structural formula

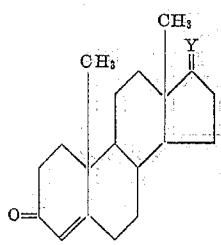

wherein Y is a member of the group consisting of $\diagdown\!\!-\!\!\!-\!\!\text{SH}(\beta)$, $\diagdown\!\!-\!\!\!-\!\!\text{SH}(\alpha)$,
$\quad\quad\quad\quad\quad\quad\quad\quad\quad\quad\quad\quad\quad\quad\quad\quad\quad\quad\quad\quad$ H $\quad\quad\quad\quad\quad$ H
$\diagdown\!\!-\!\!\!-\!\!\text{S(lower alkyl)}(\beta)$, $\diagdown\!\!-\!\!-\!\!\text{S(lower alkyl)}(\alpha)$, $\diagdown\!\!-\!\!\!-\!\!\text{S(lower alkanoyl)}(\beta)$,
$\quad\quad\quad$ H $\quad\quad\quad\quad\quad\quad\quad\quad$ H $\quad\quad\quad\quad\quad\quad\quad\quad\quad\quad\quad$ H
$\diagdown\!\!-\!\!-\!\!\text{S(lower alkanoyl)}(\alpha)$, and =S.
$\quad\quad$ H The term lower alkanoyl is defined herein as an acyl radical derived from a lower alkanoic acid. The lower alkanoyl radicals embraced in this definition include formyl, acetyl, propionyl, butyryl, valeryl, caproyl, and branched-chain isomers thereof.

It has been discovered that the 17-thiols, 17-thioethers, 17-thioketones, and 17-acylthio derivatives which constitute this invention can be prepared from readily available and relatively abundant starting materials such as dehydroisoandrosterone. For example, the steps which comprise reducing dehydroisoandrosterone acetate with sodium borohydride to the 3-monoacetate of 5-androstene-3β,17β-diol, esterification of the 17β-hydroxyl group with p-toluenesulfonyl chloride, and selective hydrolysis at the ester group at position 3 lead to the 17β-p-toluenesulfonate of 5-androstene-3β,17β-diol. The ester grouping in this compound is of the neopentyl type and by analogy with similar compounds, such as the neopentyl halides, would be expected to be resistant to replacement by another negative group. Surprisingly, when the ester is treated with sodium hydrosulfide, replacement of the ester grouping occurs readily, with the introduction of a thiol group in the α-configuration and the formation of 3β-hydroxy-5-androstene-17α-thiol. The corresponding disulfide is obtained as a by-product in this reaction, as disclosed in greater detail in the pertinent example. Oxidation of 3β-hydroxy-5-androstene-17α-thiol with a mixture of cyclohexanone and aluminum isopropoxide in toluene solution yields 3-oxo-4-androstene-17α-thiol.

Mercaptan derivatives which have the β-configuration of the thiol group are conveniently obtained from dehydroisoandrosterone by another method which has been newly developed. When the dibenzylmercaptole of dehydroisoandrosterone, described in Journal American Chemical Society, 70, 1256 (1948) is treated in liquid ammonia with metallic sodium, the reaction product is the thioketone of the following structure

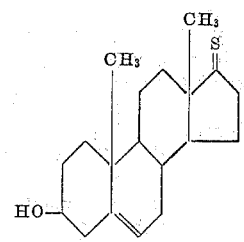

Reduction of this compound with sodium borohydride yields 3β-hydroxy-5-androstene-17β-thiol, which is converted to 3-oxo-4-androstene-17β-thiol by oxidation with cyclohexanone and aluminum isopropoxide in toluene solution. The thioketone of the foregoing structural formula also affords an oxidation product, 3-oxo-4-androstene-17-thione, when subjected to the action of a refluxing solution of cyclohexanone and aluminum isopropoxide in toluene. However, in isolating this oxidation product, we prefer to use milder conditions than are usually employed in the isolation of a product from an Oppenauer oxidation, in order to minimize or avoid hydrolytic decomposition of the sensitive thioketone group.

By contacting the mercaptans described herein with lower alkanoic acid anhydrides, conveniently in pyridine solution, thioesters are obtained in which the hydrogen of the thiol group is replaced by the acyl radical derived from a lower alkanoic acid. The compounds obtained thereby are of the type

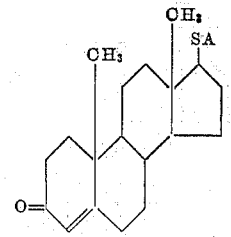

wherein A is a lower alkanoyl radical, defined as hereinbefore.

Other important compounds of this invention are the 17-thioethers which have the structural formula

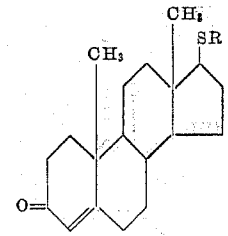

wherein R is a lower alkyl radical, and can accordingly represent methyl, ethyl, and straight or branched-chain propyl, butyl, amyl and hexyl. One method of preparing these compounds is by alkylation of either of the two isomeric 3-oxo-4-androstene-17-thiols, whereby a thioether is obtained in which the lower alkylthio group substituted at position 17 has the same configuration as the mercaptan from which it is derived. Suitable reaction media for carrying out the alkylation reaction are mixtures of a lower alkyl iodide, a sodium alcoholate, and a lower aliphatic alcohol. A useful modification of this process for the preparation of the claimed thioethers comprises first subjecting one of the isomeric 3β-hydroxy-5-androstene-17-thiols to an alkylation reaction, followed by treatment of the resulting 17-alkylthio-5-androsten-3β-ol with a refluxing solution of aluminum isopropoxide and cyclohexanone in toluene, whereby a 17-alkylthio-4-androsten-3-one is obtained.

The compounds which constitute this invention are useful in chemotherapeutics. They are effective antagonists of naturally-occurring steroid hormones which may be regarded as oxygen analogs. For example, the claimed compounds have been found to inhibit some of the masculinizing effects of testosterone. They are useful anabolic agents because they are effective in promoting the retention of nitrogen in metabolic processes. The claimed compounds also exhibit hypotensive properties. The thioethers of this invention form sulfonium salts, for example by treatment with a lower alkyl halide, which have valuable antibacterial properties. The mercaptans of this invention are useful as analytical reagents. They give characteristic precipitates with heavy metal ions, and the precipitated salts obtained with lead are useful for both the qualitative and quanitative analysis of this element.

This invention will appear more fully from the examples which follow. These examples are set forth by way of illustration only and it will be understood that the invention is not to be construed as limited in spirit or in scope by the details contained therein. It will be apparent to those skilled in the art that many modifications in materials and methods can be made without departing from the scope of this invention. In these examples, temperatures are given in degrees centigrade and quantities of materials in parts by weight.

*Example 1*

A solution of 25 parts of dehydroisoandrosterone acetate in 850 parts of methanol is cooled in an ice bath to 8° C. and treated by the addition of 12.5 parts of sodium borohydride dissolved in 250 parts of methanol. The mixture is kept in an ice bath for 10 minutes and is then treated with small portions of acetic acid until the evolution of gas is complete. An additional 50 parts of acetic acid and 3000 parts of water is then added and the precipitated product is filtered, washed with water and dried. Recrystallization of this product from aqueous acetone yields the purified 3-monoacetate of 5-androstene-3β,17-diol, melting at 147–148° C.

*Example 2*

A solution prepared from 22 parts of the 3-monoacetate of 5-androstene-3β,17β-diol, 118 parts of anhydrous pyridine and 22 parts of p-toluenesulfonyl chloride is allowed to stand for about 18 hours at 65° C. It is then poured into 1800 parts of ice water, and the precipitate is collected on a filter, washed with water and dried. By recrystallization from aqueous dioxane 3β-acetoxy-17β-p-toluenesulfonoxy-5-androstene is obtained as well-formed crystals melting at 166–168° C. This compound has the structural formula

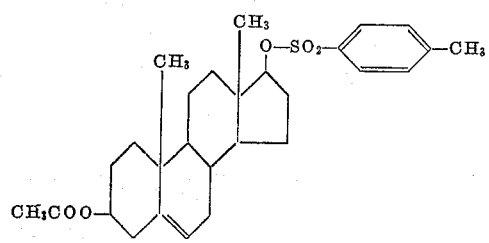

*Example 3*

A solution prepared from 30 parts of 3β-acetoxy-17β-p-toluenesulfonoxy-5-androstene, 310 parts of dioxane, 95 parts of methanol, and 46 parts of a solution prepared from equal weights of sodium hydroxide and of water is allowed to stand at room temperature for 2 hours. The mixture is then diluted with 600 parts of water and the crystalline precipitate of 17β-p-toluenesulfonoxy-5-androsten-3β-ol is collected on a filter, washed with water, and dried. This product melts at 102–103° C., then solidifies and remelts at 130–132° C. It has the structural formula

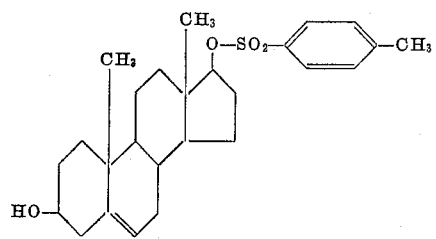

*Example 4*

A solution of sodium hydrosulfide is prepared by passing a stream of hydrogen sulfide gas through a mixture of 520 parts of ethylene glycol monoethyl ether and 35 parts of sodium methoxide, until substantially all of the sodium methoxide is consumed, as evidenced by the completion of the exothermic reaction. About 1 hour is a convenient period of time for this reaction.

This solution of sodium hydrosulfide is mixed with 14 parts of 17β-p-toluenesulfonoxy-5-androsten-3β-ol and heated under reflux for 5 hours. The mixture is then poured into 2500 parts of water and partitioned with ether. A product insoluble in both the aqueous and organic phases is collected on a filter and washed with water. This product is the disulfide melting at 265–268° C. The 3,3'-diacetate of this disulfide, prepared by heating the diol with pyridine and acetic anhydride on a steam bath, crystallizes from the reaction mixture. On being recrystallized from a mixture of benzene and ethyl acetate, it melts at 297–300° C. The ethereal solution resulting from the sodium hydrosulfide reaction is concentrated to a small volume and diluted with methanol. A crystallizate of 3β-hydroxy-5-androstene-17α-thiol separates and is collected on a filter and washed with methanol. This product melts at 142–144° C.

*Example 5*

A solution of aluminum isopropoxide is prepared by stirring 250 parts of this compound with 900 parts of toluene, and by decanting from the small amount of insoluble residue.

Three parts of 3β-hydroxy-5-androstene-17α-thiol is dissolved in 120 parts of hot toluene, and the solution is rendered anhydrous by collecting and discarding a distillate of 25 parts of the toluene. There are then added 10 parts of the previously prepared solution of aluminum isopropoxide in toluene and 14 parts of cyclohexanone. The reaction mixture is heated under reflux for 1 hour. It is then stirred with a solution of 15 parts of sodium potassium tartrate and 100 parts of water and distilled with steam. After removal of the organic solvent the crude reaction product is collected on a filter. Partial purification of this material can be conveniently achieved by recrystallization from aqueous dioxane, from aqueous methanol, or from mixtures of ether and petroleum ether. For further purification 1 part of the product in benzene solution is poured on a chromatography column prepared with 20 parts of silica. The desired compound is removed from the column by elution with a 5 volume per cent solution of ethyl acetate in benzene. Final purification by recrystallization from petroleum ether or by sublimation yields well-formed crystals of 3-oxo-4-androstene-17α-thiol melting at 156–157° C. This compound has the structural formula

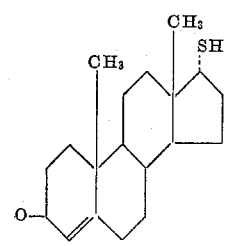

Example 6

A solution of 10 parts of testosterone, 176 parts of benzene, 22 parts of ethylene glycol and 0.2 part of p-toluenesulfonic acid monohydrate is heated under reflux for a period of 18 hours, with continuous removal of the water formed in the reaction. The reaction mixture is stirred with a solution of 1 part of potassium hydroxide in 20 parts of methanol. It is then washed with 2 portions of warm water, and the water is back-extracted with warm benzene. The benzene fractions are combined and evaporated to dryness. When the residual solid is purified by recrystallization from methanol, the ethylene glycol ketal of 3-oxo-5-androsten-17β-ol is obtained as crystals melting at 178–179° C. This compound has the structural formula

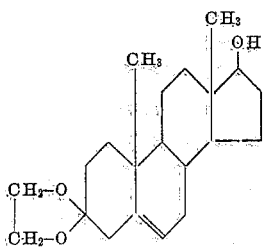

Example 7

A solution of 7.5 parts of the ethylene glycol ketal of 3-oxo-5-androsten-17β-ol, 40 parts of pyridine and 7.5 parts of p-toluenesulfonyl chloride is heated in a nitrogen atmosphere at about 60° C. for 24 hours. The contents of the reaction flask are then poured into a mixture of 450 parts of water, 5 parts of sodium hydroxide and 200 parts of ice. The amorphous solid product is collected on a filter and washed with water. This crude product is dried by dissolving it in a mixture of benzene and pyridine and removing the solvents by distillation. The crude product is then redissolved in a mixture of 45 parts of benzene and 1 part of pyridine. When this solution is diluted with successive portions of petroleum ether, the first material to separate is a tar which is discarded. By further dilution with petroleum ether and concentration of the solution, a crystalline material is obtained which softens from about 125° C. When this product is recrystallized from methanol containing a trace amount of pyridine and then from ether containing 10 volume per cent of dioxane and a trace amount of pyridine, the purified ethylene glycol ketal of 17β-p-toluenesulfonoxy-5-androsten-3-one of melting point 168–169° C. is obtained. This compound has the structural formula

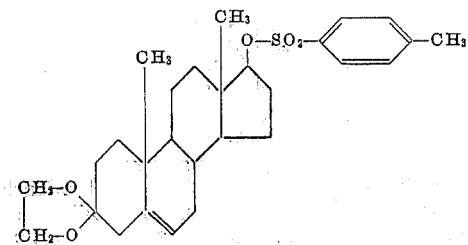

Example 8

A solution of sodium hydrosulfide is prepared by passing a stream of hydrogen sulfide gas through a mixture of 230 parts of ethylene glycol monoethyl ether and 15 parts of sodium methoxide, until substantially all of the sodium methoxide is consumed, as evidenced by the completion of the exothermic reaction. About 1 hour is a convenient period of time for this reaction.

This solution of sodium hydrosulfide is mixed with 6 parts of the ethylene glycol ketal of 17β-p-toluenesulfonoxy-5-androsten-3-one and heated under reflux for 6 hours. The cooler reaction mixture is poured into 1000 parts of water and partitioned with ether. The residual solid obtained by evaporation of the ethereal solution is extracted with methanol, and the solution thus obtained is treated with a saturated solution of lead acetate in methanol. The precipitated yellow lead salt is collected on a filter, washed with methanol, dried and dissolved in 105 parts of acetic acid. This solution is then treated with hydrogen sulfide, and the precipitated lead sulfide is collected on a filter and washed with 50 parts of acetic acid. The colorless filtrate is diluted with 50 parts of water and heated on the steam bath for 20 minutes. It is then diluted with an additional 100 parts of water and distilled in a vacuum until an oily residue remains. This oil, which can be crystallized from a mixture of ether and petroleum ether, is preferably purified by dissolving it in benzene and pouring it on a chromatography column prepared from 20 parts of silica. Elution with a 5 volume per cent solution of ethyl acetate in benzene, followed by sublimation of the crystalline residue by heating it in a vacuum at about 140–145° C., yields purified 3-oxo-4-androstene-17α-thiol melting at 156–157° C. This product is identical with that produced by the procedure of Example 5.

Example 9

A mixture of 61 parts of 3β-hydroxy-5-androstene-17α-thiol, 790 parts of anhydrous methanol, 12.3 parts of sodium methoxide and 32 parts of methyl iodide is heated under reflux for a period of 3 hours, after which it is chilled and filtered to remove a small amount of insoluble material. The filtrate is diluted with water, and the crystalline precipitate which forms is collected on a filter. Recrystallization of this material from methanol or from aqueous methanol gives purified 17α-methylthio-5-androsten-3β-ol melting at about 160–161° C.

Example 10

A mixture of 6 parts of 3β-hydroxy-5-androstene-17α-thiol, 96 parts of anhydrous propyl alcohol, 1.9 parts of sodium propoxide and 3.8 parts of propyl iodide is heated under reflux for a period of 3 hours. The reaction mixture is then poured, with stirring, into several times its volume of water and the precipitated product, 17α-propylthio-5-androsten-3β-ol, is collected on a filter. It is purified by recrystallization from methanol.

Example 11

A solution of aluminum isopropoxide is prepared by stirring 250 parts of this compound with 900 parts of toluene and by decanting from the small amount of insoluble residue.

A mixture of 30 parts of 17α-methylthio-5-androsten-3β-ol, 870 parts of anhydrous toluene, 150 parts of the previously prepared solution of aluminum isopropoxide in toluene and 285 parts of cyclohexanone is heated under reflux for a period of 1 hour. The cooled reaction mixture is then stirred with a solution of 150 parts of sodium potassium tartrate in 2000 parts of water and distilled with steam until the organic solvents are removed. The aqueous suspension remaining in the distillation vessel is extracted with ether, and the ethereal extract is evaporated to dryness. By recrystallization of the residue from aqueous acetone and from petroleum ether, there is obtained purified 17α-methylthio-4-androsten-3-one melting at 121–122.5° C. This compound has the structural formula

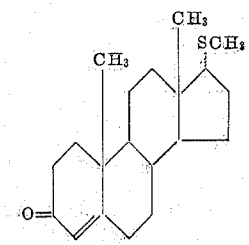

Example 12

A suspension of 5.19 parts of the dibenzylmercaptole of dehydroisoandrosterone in 130 parts of liquid ammonia is treated with a total of 5.2 parts of sodium, added in portions at 10 minute intervals over a period of 2 hours. Ammonium chloride (15 parts) and ether (210 parts) are then added and the slurry is stirred for about 16 hours. About 500 parts of water and 15 parts of ammonium chloride are added and the ethereal phase is separated and combined with an ether extract of the aqueous phase. The combined ethereal solution is washed with water and then concentrated to a residual pink oil. A solution of this oil in benzene is poured on a silica gel chromatography column. Elution with benzene yields first a small amount of dibenzyl melting at 45–48° C. Further elution with a 2 volume per cent solution of ethyl acetate in benzene affords 3β-hydroxy-5-androstene-17-thione. After recrystallization from a mixture of benzene and petroleum ether, this compound melts at 168–170° C. It has the structural formula

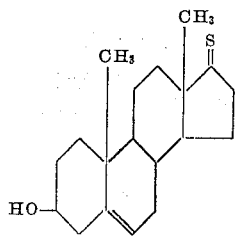

When this compound is dissolved in methanol and treated with a methanolic solution of lead acetate, a bright yellow lead salt precipitates. This precipitate does not begin to form immediately, but only after a delay of at least several seconds, as it is probably a salt of the enethiol which is in tautomeric equilibrium with the thioketone. Formation of the lead salt of this compound affords an alternative means of purification, as the thioketone is regenerated from the salt by such means as dissolving the salt in acetic acid and precipitating the thioketone by dilution with water.

Example 13

Forty parts of the dibenzylmercaptole of dehydroisoandrosterone is added to a continuously stirred solution of 32 parts of sodium in 700 parts of liquid ammonia. After 1 hour the originally blue color is discharged. There is then added 355 parts of dry ether and an additional 15 parts of sodium, and stirring is continued for 2 more hours. A total of 160 parts of absolute ethanol is added in small portions, followed by 80 parts of 95% ethanol and 50 parts of water. The reaction mixture is poured into 1000 parts of water and the separated aqueous layer which contains some suspended solid (presumably the sodium salt of the enethiol form of 3β-hydroxy-5-androstene-17-thione) is extracted with 140 parts of ether. The aqueous suspension is separated and treated with 140 parts of glacial acetic acid and the crystalline product which separates is collected on a filter. It is extracted with a boiling solution of 330 parts of petroleum ether and 210 parts of benzene. This solution is filtered to remove insoluble impurities, and the filtrate is concentrated and cooled to yield a crystallizate of 3β-hydroxy-5-androstene-17-thione melting at about 158–161° C. For some purposes material of this degree of purity is satisfactory for use. Further purification can be achieved by chromatography on a silica gel column. Elution of the chromatography column with from 2 to 5 volume per cent ethyl acetate in benzene affords purified 3β-hydroxy-5-androstene-17-thione melting at 170–172° C.

Example 14

A solution of 1.34 parts of 3β-hydroxy-5-androstene-17-thione in 52 parts of acetic acid is treated by the addition of 3 parts of concentrated hydrochloric acid. After the mixture has been allowed to stand at 65° C. for about 30 minutes, it is diluted with water. The precipitated product is collected and recrystallized from a mixture of benzene and petroleum ether and then from aqueous ethanol, giving dehydroisoandrosterone acetate of melting point 170–171° C.

Example 15

A solution of 2 parts of 3β-hydroxy-5-androstene-17-thione in 48 parts of methanol is added to a solution of 4 parts of sodium borohydride in 32 parts of methanol. After 10 minutes at room temperature, the mixture is acidified by the cautious addition of small portions of 10% acetic acid. The precipitate formed by dilution with water is collected on a filter and dried. By recrystallization from a mixture of ether and petroleum ether and then from methanol, there is obtained 3β-hydroxy-5-androstene-17β-thiol melting at 174.5–175.5° C.

Example 16

A solution of 16 parts of 3β-hydroxy-5-androstene-17β-thiol, 1600 parts of methanol, 3 parts of sodium methoxide, and 7.6 parts of methyl iodide is heated under reflux for 3 hours. The reaction mixture is diluted with water, and the precipitated product is collected on a filter. By recrystallization from aqueous methanol there is obtained puried 17β-methylthio-5-androstene-3β-ol melting at 149–150° C.

Example 17

A solution of aluminum isopropoxide is prepared by stirring 250 parts of this compound with 900 parts of toluene and by decanting from the small amount of insoluble residue.

A mixture of 1 part of 3β-hydroxy-5-androstene-17β-thiol, 43 parts of anhydrous toluene, 5 parts of the previously prepared solution of aluminum isopropoxide in toluene and 10 parts of cyclohexanone is heated under reflux for a period of 20 minutes. The cooled reaction mixture is then stirred with a solution of 8 parts of sodium potassium tartrate in 50 parts of water and distilled with steam until the organic solvents are removed. The gummy product is collected on a filter and triturated with a mixture of ether and petroleum ether. Recrystallization from aqueous methanol then yields purified 3-oxo-4-androstene-17β-thiol melting at 118–119° C. This compound has the structural formula

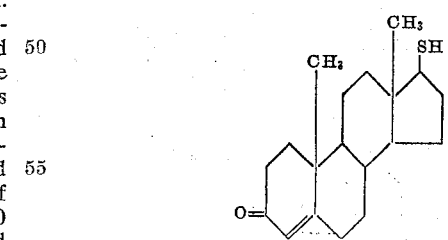

An additional quantity of this compound is obtained by dissolving the residues from the crystallization liquors in benzene, pouring this solution on a silica gel chromatography column, and eluting with a 2 volume per cent solution of ethyl acetate in benzene.

Example 18

A stirred solution of 9.6 parts of 17α-methylthio-5-androsten-3β-ol in 880 parts of benzene is treated over a period of 30 minutes by the gradual addition of a 0.3 molar solution of perbenzoic acid in benzene containing a total of 8.28 parts of perbenzoic acid. After an additional hour the solution is washed with sodium bicarbonate solution and with water and then concentrated to dryness. The residue in benzene solution is reprecipitated by the addition of petroleum ether. This product is then crystallized several times from aqueous alcohol and finally from a mixture of benzene and petroleum ether to give purified 17α-methylsulfonyl-5-androsten-3β-ol melting at 225–227° C. It has the structural formula

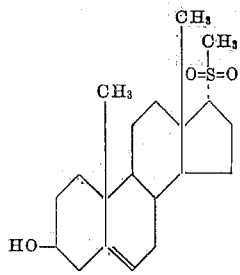

*Example 19*

Five parts of 17α-methylsulfonyl-5-androsten-3β-ol is dissolved in a solution prepared from 3.6 parts of potassium and 70 parts of tert.-butanol. This reaction mixture is heated under reflux for 17 hours and then concentrated by distillation to about two-thirds of its original volume. The remaining solution is poured into about 300 parts of ice water and this mixture is acidified by the addition of 15 parts of concentrated hydrochloric acid. The precipitated product is collected on a filter, washed with water, dried, and recrystallized from ethyl alcohol or from ethyl acetate. In this manner there is obtained the isomerized sulfone, 17β-methylsulfonyl-5-androsten-3β-ol melting at 242–244° C. This compound has the structural formula

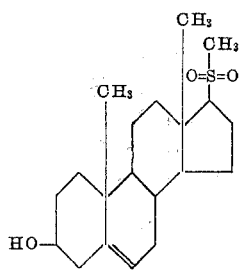

*Example 20*

A quantity of tetrahydrofuran is purified for this reaction. This is conveniently accomplished by drying it over sodium hydroxide and distilling it successively from sodium and from lithium aluminum hydride. A solution of 2.9 parts of 17β-methylsulfonyl-5-androsten-3β-ol in 27 parts of tetrahydrofuran is added to a solution of 6 parts of lithium aluminum hydride in 90 parts of tetrahydrofuran, and the reaction mixture is heated under reflux for 16 hours. Unreacted lithium aluminum hydride is decomposed by the addition of ethyl acetate. Water (50 parts), 10% sulfuric acid (300 parts), and water (500 parts) are added in succession, with efficient stirring. The suspension is extracted with a total of 700 parts of ether in three portions, and the washed ethereal solution is concentrated to about 5% of its original volume. The solvent mixture remaining at this concentration contains a large percentage of tetrahydrofuran. Water is added, and the crude solid product which precipitates is collected on a filter and washed. This crude product is extracted with a total of 620 parts of benzene in two portions. Some unreacted 17β-methylsulfonyl-5-androsten-3β-ol remains undissolved and is recovered by filtration. The benzene solution is poured on a chromatography column prepared from 105 parts of silica. By elution with a 10 volume per cent solution of ethyl acetate in benzene there is obtained 17β-methylthio-5-androsten-3β-ol. After recrystallization from aqueous methanol this product melts at 150° C. and is identical with the product of Example 16. By elution of the chromatography column with a 30 volume per cent solution of ethyl acetate in benzene, an additional quantity of unreacted 17β-methylsulfonyl-5-androsten-3β-ol is recovered.

*Example 21*

A solution of aluminum isopropoxide is prepared by stirring 250 parts of this compound with 900 parts of toluene, and by decanting from the small amount of insoluble residue.

A mixture of 85 parts of 3β-hydroxy-5-androstene-17-thione, 4350 parts of anhydrous toluene, 500 parts of the previously prepared solution of aluminum isopropoxide in toluene and 950 parts of cyclohexanone is heated under reflux for 20 minutes. The cooled reaction mixture is diluted with ether and extracted with a solution of 2000 parts of sodium potassium tartrate in 20,000 parts of water. The organic phase is dried over sodium sulfate, filtered and concentrated to a residual pink oil. A solution of this oil in petroleum ether is allowed to stand, whereupon it deposits orange-colored crystals of 3-oxo-4-androstene-17-thione melting at 139–141° C. An additional quantity of this product is obtained by chromatography of the mother liquor on a column prepared with 1500 parts of silica. The fraction eluted with a 2 volume per cent solution of ethyl acetate in benzene affords, after recrystallization from a mixture of benzene and petroleum ether, purified 3-oxo-4-androstene-17-thione melting at 140–141° C. This compound has the structural formula

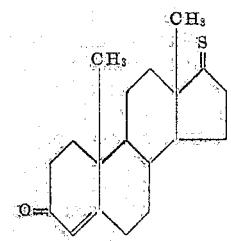

*Example 22*

A solution prepared from 1 part of 3-oxo-4-androstene-17β-thiol, 10 parts of acetic anhydride and 10 parts of pyridine is allowed to stand at room temperature for 16 hours. It is then poured into about 100 parts of ice water, with stirring, and the precipitated product is collected on a filter. Recrystallization from a mixture of acetone and petroleum ether yields 17β-acetylthio-4-androsten-3-one melting at 132–133° C. This compound has the structural formula

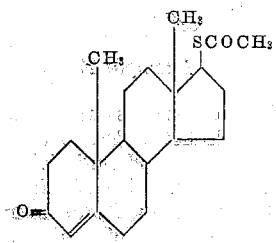

*Example 23*

By the procedure of Example 22 with the substitution of an equal weight of 3-oxo-4-androstene-17α-thiol for the 3-oxo-4-androstene-17β-thiol, there is obtained 17α-acetylthio-4-androsten-3-one.

*Example 24*

A mixture of 1 part of 3-oxo-4-androstene-17α-thiol, 10 parts of pyridine and 8 parts of valeric anhydride is heated on a steam bath for 2 hours and is then allowed to stand at room temperature for 18 hours. The reaction mixture is poured, with stirring, into 100 parts of ice water, and the precipitated product is collected.

This compound is 17α-valerylthio-4-androsten-3-one, having the following structural formula

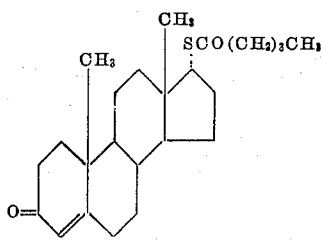

Example 25

By the procedure of Example 24 with the substitution of an equal weight of 3-oxo-4-androstene-17β-thiol for the 3-oxo-4-androstene-17α-thiol, there is obtained 17β-valerylthio-4-androsten-3-one.

Example 26

A solution of aluminum isopropoxide is prepared by stirring 250 parts of this compound with 900 parts of toluene, and by decanting from the small amount of insoluble residue.

A mixture of 6.1 parts of 17β-methylthio-5-androsten-3β-ol, 175 parts of toluene, 20 parts of the solution of aluminum isopropoxide in toluene and 38 parts of cyclohexanone is heated under reflux for 20 minutes. A solution of 25 parts of sodium potassium tartrate in 200 parts of water is added and the mixture is distilled with steam in order to remove the organic solvent. About 4 parts of sodium chloride is dissolved in the remaining aqueous phase, and the insoluble reaction product is collected on a filter and washed with water. For purification a solution of this product in about 80 parts of petroleum ether is decolorized with activated charcoal, filtered, concentrated to about 15–20 parts and allowed to stand. This solution deposits colorless needles of 17β-methylthio-4-androsten-3-one melting at 131–132.5° C. This compound has the structural formula

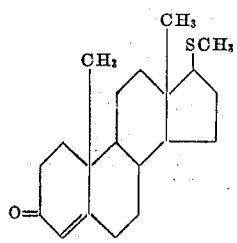

Example 27

Ten parts of 3-oxo-4-androstene-17β-thiol and then 6.6 parts of butyl iodide are added to a solution prepared by dissolving 0.75 part of sodium in 950 parts of butanol. After this reaction mixture has stood at room temperature for 18 hours, it is poured into several times its volume of water, and the precipitated product is collected on a filter. Purified 17β-butylthio-4-androsten-3-one is obtained by recrystallization of this product from methanol.

Example 28

By the procedure of Example 27, with the substitution of an equal weight of 3-oxo-4-androstene-17α-thiol for the 3-oxo-4-androstene-17β-thiol, 17α-butylthio-4-androsten-3-one is obtained.

Example 29

A solution prepared from 7.5 parts of 17β-methylthio-5-androsten-3β-ol, 80 parts of butanone and 85 parts of methyl bromide is placed in a tightly sealed reaction vessel, and allowed to stand for 18 hours at about 65° C. The crystalline mass is collected on a filter and washed with anhydrous ether. Recrystallization of this product from a mixture of absolute ethanol and anhydrous ether affords the methobromide of 17β-methylthio-5-androsten-3β-ol melting at about 176–178° C. with decomposition. This compound has the structural formula

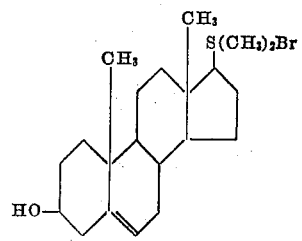

Example 30

A solution prepared from 5 parts of 17β-methylthio-4-androsten-3-one, 50 parts of butanone and 85 parts of methyl bromide is placed in a tightly sealed reaction vessel, and allowed to stand for 24 hours at about 65° C. The insoluble reaction product is then collected on a filter and purified by recrystallization from a mixture of absolute ethanol and anhydrous ether. This product is the methobromide of 17β-methylthio-4-androsten-3-one. It melts at about 183–184° C. and has the following structural formula

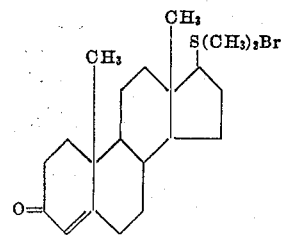

What is claimed is:
1. A compound having the structural formula

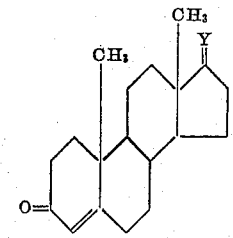

wherein D is a member of the group consi4ting of $\overset{-SH(\beta)}{H}$, $\overset{-SH(\alpha)}{H}$ $\overset{-S(\text{lower alkyl})(\beta)}{H}$, $\overset{-S(\text{lower alkyl})(\alpha)}{H}$, $\overset{-S(\text{lower alkanoyl})(\beta)}{H}$ $\overset{-S(\text{lower alkanoyl})(\alpha)}{H}$, and $=S$.

2. A compound having the structural formula

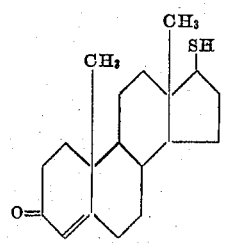

3. 3-oxo-4-androstene-17β-thiol.
4. 3-oxo-4-androstene-17α-thiol.

5. A compound having the structural formula
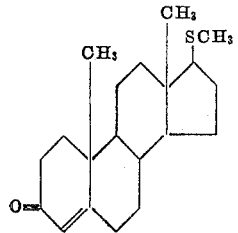
6. 17β-methylthio-4-androsten-3-one.
7. 17α-methylthio-4-androsten-3-one.
8. 3-oxo-4-androstene-17-thione.
No reference cited.